(12) United States Patent
Basile et al.

(10) Patent No.: US 8,105,973 B2
(45) Date of Patent: Jan. 31, 2012

(54) SUPPORTED CATALYST FOR PRODUCING H$_2$ AND/OR CO FROM LOW MOLECULAR WEIGHT HYDROCARBONS

(75) Inventors: Francesco Basile, Catanzaro (IT); Pascal Del Gallo, Dourdan (FR); Giuseppe Fornasari, Bologna (IT); Daniel Gary, Montigny-le-Bretonneux (FR); Valentina Rosetti, Modigliana (IT); Angelo Vaccari, Bologna (IT)

(73) Assignee: L'Air Liquide Societe Anonyme pour l'Etude et l'Exploiation des Procedes Georges Claude, Paris (FR)

( * ) Notice: Subject to any disclaimer, the term of this patent is extended or adjusted under 35 U.S.C. 154(b) by 0 days.

(21) Appl. No.: 12/949,289

(22) Filed: Nov. 18, 2010

(65) Prior Publication Data

US 2011/0118112 A1    May 19, 2011

Related U.S. Application Data

(62) Division of application No. 10/559,139, filed as application No. PCT/IB2004/001821 on Jun. 4, 2004, now abandoned.

(30) Foreign Application Priority Data

Jun. 6, 2003  (EP) .................................. 03076781

(51) Int. Cl.
*B01J 21/06* (2006.01)
*C01B 3/26* (2006.01)
(52) U.S. Cl. .................. 502/252; 252/373; 423/651
(58) Field of Classification Search .......... 423/1, 111, 423/115, 118.1, 155, 324, 325, 326, 327.1, 423/327.2, 328.1, 331, 564, 579, 592.1, 594.3, 423/600, 594.16; 502/252; 252/373
See application file for complete search history.

(56) References Cited

U.S. PATENT DOCUMENTS 4,217,295 A    8/1980  Friedrich et al.
(Continued)

FOREIGN PATENT DOCUMENTS

EP       0725038        7/1996
(Continued)

OTHER PUBLICATIONS

PCT Search Report and Written Opinion for PCT/IB2004/001821.
(Continued)

*Primary Examiner* — Wayne Langel
*Assistant Examiner* — Syed Iqbal
(74) *Attorney, Agent, or Firm* — Elwood L. Haynes

(57) ABSTRACT

Chemical combination (C) between an active solid phase which is covalently bound to the surface of an inert solid phase, characterized in that said solid active phase essentially consists in a solid solution of a mixture of at least a magnesium oxide type phase compound and at least a magnesium silicate type phase compound in which Al, and Rh and/or Ni cations are soluted and characterized in that said inert solid phase is either a compound represented by the general formula (I):

$$Al_aNi_bRh_cMg_dSi_eO_f \qquad (I)$$

wherein a, b, c, d, and e are integers which are greater than or equal to 0,
f is an integer greater than 0,
the sum a+b+c+d≠0, and
wherein (3a+2b+3c+2d+4e)/2=f,
or a mixture of compounds represented by the said general formula (I),
provided that at least one of the Si, Al, Mg, Rh or Ni elements, which is present in the solid active phase, is also present in the solid inert phase.
Use of a catalyst in chemical reactions involving the conversion of hydrocarbonaceous feedstocks.

5 Claims, 6 Drawing Sheets

U.S. PATENT DOCUMENTS

| | | |
|---|---|---|
| 5,614,163 A | 3/1997 | Bhattacharyya et al. |
| 6,458,334 B1 | 10/2002 | Tamhankar et al. |
| 7,101,494 B2 | 9/2006 | Pham-Huu et al. |

FOREIGN PATENT DOCUMENTS

| | | |
|---|---|---|
| EP | 725038 A1 * | 8/1996 |
| WO | 01025142 | 4/2001 |
| WO | 01028679 | 4/2001 |
| WO | WO 0125142 A1 * | 4/2001 |
| WO | 01053196 | 7/2001 |
| WO | 03000398 | 1/2003 |
| WO | 03099436 | 12/2003 |

OTHER PUBLICATIONS

Basile F. et al., Partial Oxidation of Methane, Effect of Reaction Parameters And Catalyst Composition on the Thermal Profile and Heat Distribution:, Catalysis Today, vol. 64, 2001, p. 21-30.

Basile F. et al, "Catalytic Partial Oxidation and Co2-Reforming on Rh- and Ni-based Catalysts Obtained From Hydrotalcite Precursors", Applied Clay Science, vol. 13, 1998, p. 329-345.

* cited by examiner

Figure 1: Schematic representation of the "reactive-impregnation"

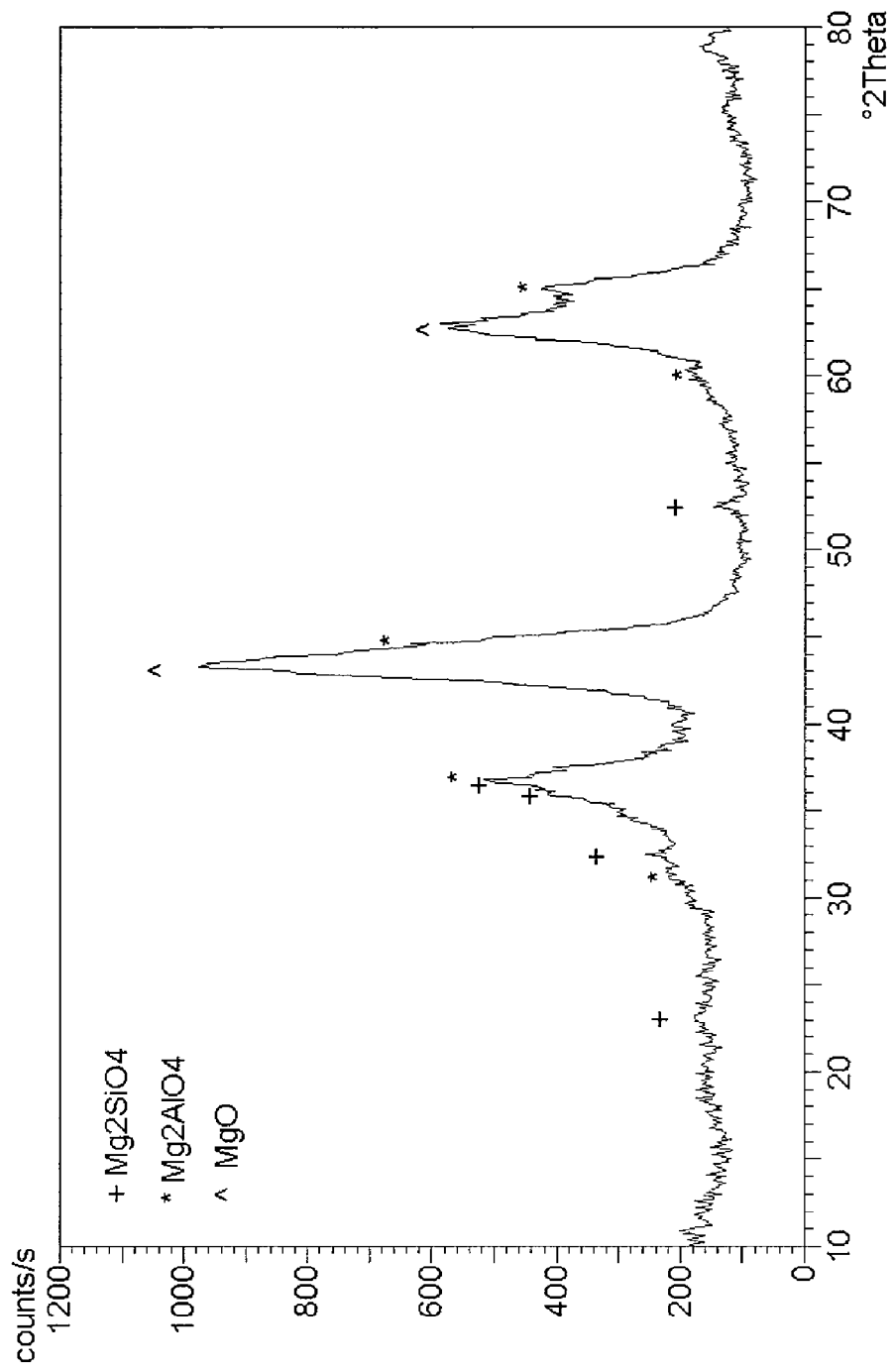
Figure 2: XRD Pattern of the sample of example 1.

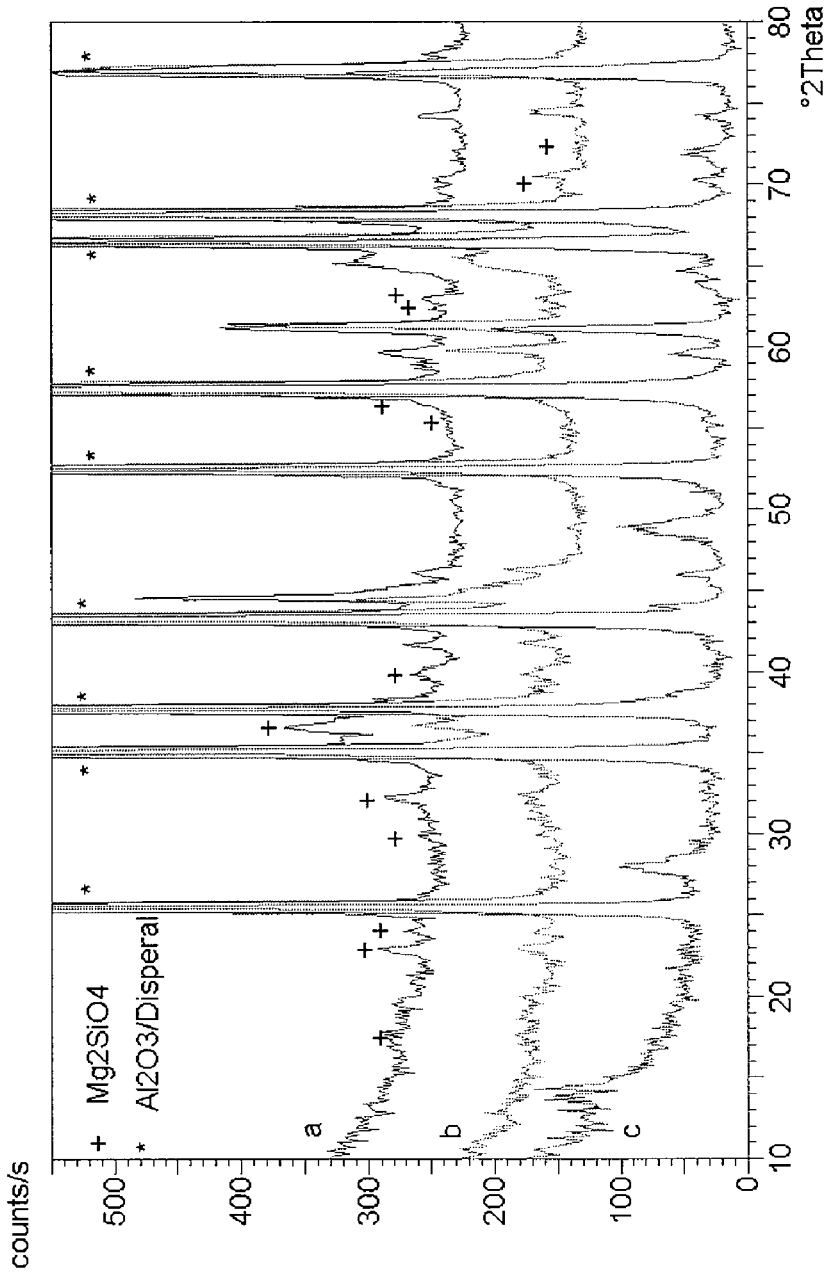
Figure 3: XRD Patterns of the samples of examples 3 and 4 and their comparison with the support.
(a) Ex-HT sil $Ni_8Rh_{0.15}Mg_{60}$/Disperal/$\alpha$-$Al_2O_3$,
(b) Ex-HT sil $Ni_8Rh_{0.15}Mg_{60}Al_{31.85}$/Disperal/$\alpha$-$Al_2O_3$
(c) Disperal/$\alpha$-$Al_2O_3$.

CPO duration tests results on $Ni_8Rh_{0.15}Mg_{60}Al_{31.85}$ / Disperal / $\alpha$-$Al_2O_3$ (example 3 / concept 1.c)

SUPPORTED CATALYST FOR PRODUCING H₂ AND/OR CO FROM LOW MOLECULAR WEIGHT HYDROCARBONS

CROSS-REFERENCE TO RELATED APPLICATIONS

The present application is a division application of U.S. patent Ser. No. 10/559,139, filed on Jun. 17, 2006 now abandoned which is a §371 application of International PCT Application PCT/IB2004/001821, filed Jun. 4, 2004, which claims priority from European Patent Application No. 03076781.8 filed on Jun. 6, 2003, the entire contents of which are incorporated herein by reference.

FIELD OF INVENTION

The present invention relates to a new catalyst for the partial oxidation of hydrocarbons.

BACKGROUND

The catalytic partial oxidation of hydrocarbons, natural gas or methane to synthesis gas has been processed for many years. While currently limited as an industrial process, the partial oxidation is of interest for the significant released heat and for the use of smaller reactors.

European patent application EP 0 725 038, discloses materials having a layered structure of the Hydrocalcite type, in which rhodium is inside the interior of said structure, which can be represented by the general formula:

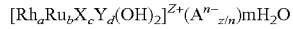
$[Rh_aRu_bX_cY_d(OH)_2]^{Z+}(A^{n-}{}_{z/n})mH_2O$ wherein X and Y are divalent or trivalent metal cations,
$0 \leq a \leq 0.5$; $0 \leq b \leq 0.5$; $0.5 \leq c \leq 0.9$; $0 \leq d \leq 0.5$ and $a+b+c+d=1$,
m is 0 or a positive integer,
A is a hydroxyl or any anion or anionic complex having n electrical charge.
z is the total electrical charge of the cationic component.

International application WO 01/25142, discloses a catalyst which is obtained from an Hydrotalcite-type precursor containing Ni, which is worked in a reforming process using steam and/or CO₂.

International application WO 01/53196, discloses a catalyst which consists in a refractory fibrous structure comprising a plurality of ceramic oxide fibres and at least one active catalyst element, chosen among Rh, Ni and Cr, supported on said fibrous structure. Such a catalyst is claimed to better resist a thermal shock, than the conventional supported catalysts do.

International application WO 01/28679 discloses a catalyst which consists in a mixture of at least two different metal carbides (especially Mo, W, Cr), which optionally include an additional promoter and/or a catalyst support. It is claimed that no appreciable coking occurs, that the catalyst deactivation is avoided or at least delayed, and that this catalyst can be industrially worked under better economical conditions than the conventional catalysts do.

International application WO 03/000398, discloses a catalyst which consists in a classical catalytic active phase such as a metal transition element (Ni, Mo, Rh, Pt, . . . ), which is supported on a silicon carbide having a high specific surface area less or equal to 100 m²/g. The contact time between the gaseous hydrocarbon, the oxidizing gas, optionally in the presence of a small amount of water, and the silicon carbide catalytic support, is greater than 0.05 s, the temperature greater than 800° C. and the pressure inside the reactor greater than the atmospheric pressure. The advantages of this invention are the use of a new silicon carbide support having a high surface area, typically between 10 and 50 m²/g, with classical active phases.

U.S. Pat. No. 6,458,334 B1 discloses a catalytic partial oxidation process involving the use of a classical metal catalyst (Ni, Co, Ir, Pt, . . . ) or a combination of them thereof which is supported on or in a ceria monolith. The pressure is between 10⁵ Pa and 20.10⁵ Pa (1 to 20 bar), the Gas Hourly Space Velocity (GHSV) is of about 50,000 to 500,000 hr⁻¹.

However, none of the known existing catalytic partial oxidation processes are able to reach a sufficiently high conversion rate of reactant gas. Moreover, a high selectivity of CO and H₂ reaction products can only be reached with the use of a large amount of rare and costly catalysts, or with taking the risk of an excessive coking or of a premature failure due to a lack of heat resistance and a mechanical instability of cheaper catalysts on the support structure.

There is indeed a continuing need for new catalysts that are mechanically stable, with high surface area, preferably from 10 to 300 m²/g, and that retain a high level of activity and selectivity to CO and H₂ products under conditions of high temperature, without excessive coking.

In the International application PCT/IB03/01673 (WO 03/099436) filed on Apr. 30, 2003, the inventors claimed a composition to overcome the above-mentioned drawbacks, which may thus be used as a catalyst for partial oxidation of hydrocarbons and which essentially consists in a solid solution of a mixture of at least a magnesium oxide type phase compound and at least a magnesium silicate type phase compound in which Al, and Rh and/or Ni cations are soluted.

The precursor of this composition is a hydrotalcite-type structure. After calcination at 900° C., two main phases are present: magnesium oxide type phase, a magnesium silicate type phase (forsterite-type), in which Al and the cation of the active phase (Rh and/or Ni) are soluted.

The composition claimed in PCT/IB03/01673 can be prepared from a precursor containing active metals of VIII group (Ni and/or Rh) and silicates as anions having a structure that is referred to as "hydrotalcite-like" (HT). Hydrotalcite-like compounds are anionic clays, that have a sheet-like structure. The sheets are separated by anions which balance the net positive charge of the sheets. In the context of the present invention, the anions of the anionic sheets are silicates or polysilicates and in the cationic sheets are present Ni or Rh, or a combination of those. The materials obtained by calcination of said Hydrotalcite-like compounds have high thermal resistance and are very stable. After an activation procedure, they are very active and do not show any carbon formation in the catalytic partial oxidation process.

More specifically, this composition is prepared from an HT precursor represented by the general formula (I):

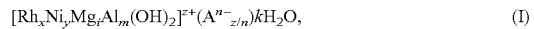
$[Rh_xNi_yMg_lAl_m(OH)_2]^{z+}(A^{n-}{}_{z/n})kH_2O,$ (I)

wherein $A^{n-}$ is mainly a silicate or a polysilicate anion;
$0 \leq x \leq 0.3$;
$0 \leq y \leq 0.9$;
$0 \leq l \leq 0.9$;
$0 \leq m \leq 0.5$;
$0 \leq k \leq 10$;
$x+y>0$;
$0.5 \leq y+l \leq 0.9$;
$x+y+l+m=1$; and
z is the total electrical charge of the cationic element.
In a preferred embodiment of this composition,
$0 \leq x \leq 0.1$;

$0 \leq y \leq 0.3$;
$0.3 \leq l \leq 0.8$;
$0.1 \leq m \leq 0.4$;
$0 \leq k \leq 5$;
$x+y>0$;
$0.6 \leq y+l \leq 0.8$;
$x+y+l+m=1$.

Among these above mentioned HT precursor, the following compounds are the most preferred:

$[Ni_{0.08}Mg_{0.60}Al_{0.32}(OH)_2]^{0.32+}(SiO_3^{2-})_{0.16}kH_2O$,
$[Ni_{0.08}Rh_{0.0015}Mg_{0.60}Al_{0.3185}(OH)_2]^{0.32+}(SiO_3^{2-})_{0.16}kH_2O$,
$[Rh_{0.005}Mg_{0.71}Al_{0.285}(OH)_2]^{0.32+}(SiO_3^{2-})_{0.16}kH_2O$,
$[Ni_{0.01}Rh_{0.0002}Mg_{0.67}Al_{0.3198}(OH)_2]^{0.32+}(SiO_3^{2-})_{0.16}kH_2O$,
$[Ni_{0.02}Mg_{0.63}Al_{0.35}(OH)_2]^{0.35+}(SiO_3^{2-})_{0.175}kH_2O$,
$[Rh_{0.0004}Mg_{0.65}Al_{0.3496}(OH)_2]^{0.35+}(SiO_3^{2-})_{0.175}kH_2O$,
$[Ni_{0.02}Mg_{0.78}Al_{0.20}(OH)_2]^{0.35+}(SiO_3^{2-})_{0.175}kH_2O$, and
$[Rh_{0.0004}Mg_{0.80}Al_{0.1996}(OH)_2]^{0.20+}(SiO_3^{2-})_{0.10}kH_2O$.

In order to improve the stability of this composition and to improve its selectivity, the inventors have tried to develop a process to support the above-mentioned composition (the active phase) on an inert support.

They however found that working a classical deposition process on standard catalytic supports, such as alumina, zirconia, silicon carbide or magnesium oxide, was not efficient. In fact the deposition of the hydrotalcite precursor on α-alumina beads did not tie with the support, the active phase being separated from the beads, the same occurred with commercial silicon carbide which have an average specific area of less than 5 m²/g, and the tentative with $ZrO_2$ pellets resulted in the crash of the pellets during the preparation.

That is why they develop a new process on the "form memory" concept, to increase the interaction between the support and the active phase in order to improve the stability of the resulting to high temperature. This concept involves the use one raw material (O), which owns one or several chemical elements (for example A), which is still present in the final product after synthesis. This raw material, which can have several geometric forms (pellets, beads, honeycomb, filter, tube, . . . ) and several architecture/microstructures (high surface area, porosity, pore size, . . . ) is attacked by chemical reactions (solid-liquid and/or solid-gas and/or solid-solid reactions) with precursors (B, C for example), which must also be present in the final product. The final product is a new material (ABC for example), which is supported on the initial raw material (O).

In the best case, one or several layers of the new material (ABC) are developed around a core of the raw material.

Such a concept was first disclosed in U.S. Pat. No. 4,914,070 and related to the production of silicon carbide with high surface area for catalyst applications. This patent disclosed a process for the production of fine grains of silicon carbon, which are formed by reacting SiO vapour on carbon. SiO vapour is obtained by heating a mixture of $SiO_2$ and Si at a temperature between 1100 to 1400° C. This vapour attacks reactive carbon with a high specific surface area (more than 200 m²/g) in a second zone at temperature between 1100 to 1400° C. The final product issued from the reaction between $SiO_{gas}$ and $C_{solide}$ is silicon carbide with high surface area (more than 100 m²/g) with or without a carbon core. The main advantages of this process are the production of silicon carbide with high surface area while keeping the initial geometry and the architecture/microstructure of the raw carbon.

The ideas of "dissolution/precipitation" method similar to that described new section are developed to build hydrotalcites of two Congresses ICC ($6^{th}$ and $11^{th}$ International Congresses on Catalysis) in Baltimore (1976, 1996).

Papers of van Dillen J. A., Geus J. W., Hermans L. A. and van der Meijden J. (1976, $6^{th}$ ICC) described a method of production of supported copper or nickel catalysts by "deposition-precipitation". The support, which reacted with the nickel and the cobalt precursor in solution to form an hydrotalcite, was $SiO_2$. Penetration of nickel ions into the silica support or migration of the silica, lead to thicker nickel hydrotalcite layers. Conversion of an appreciable fraction of the support into a compound having a layer structure profoundly affected the texture of the support.

Papers of Espinose J. B. and Clause O. (1996, $11^{th}$ ICC, p 1321-1329) described the promotion of -alumina dissolution by metal ions during impregnation and the thermal stability of the formed coprecipitates. The metallic elements were nickel and cobalt. The method developed was the "deposition-precipitation" and the support was -alumina. As described in the $6^{th}$ ICC the Al can reacted in solution with the Ni(II) ions or Co(II) to form an hydrotalcite structure. The experiments allow the separation of the secondary phase—hydrotalcite—from the mother oxide support, alumina.

However, the authors suggested that, the supported hydrotalcites were, in fact, weakly bound to the surface and free to move away from alumina once formed. In both papers, no chemical reaction was studied using this new type of "active support".

That is why the inventors developed a new combination which overcomes the above mentioned drawbacks.

SUMMARY OF THE INVENTION

Chemical combination (C) between an active solid phase which is covalently bound to the surface of an inert solid phase, characterized in that said solid active phase essentially consists in a solid solution of a mixture of at least a magnesium oxide type phase compound and at least a magnesium silicate type phase compound in which Al, and Rh and/or Ni cations are soluted and characterized in that said inert solid phase is either a compound represented by the general formula (I):

$$Al_aNi_bRh_cMg_dSi_eO_f \quad (I)$$

wherein a, b, c, d, and e are integers which are greater than or equal to 0,
f is an integer greater than 0,
the sum $a+b+c+d\neq 0$, and
wherein $(3a+2b+3c+2d+4e)/2=f$,
or a mixture of compounds represented by the said general formula (I),
provided that at least one of the Si, Al, Mg, Rh or Ni elements, which is present in the solid active phase, is also present in the solid inert phase.

Use of a catalyst in chemical reactions involving the conversion hydrocarbonaceous feedstocks.

BRIEF DESCRIPTION OF THE FIGURES

FIG. 2 provides an XRD analysis that shows the peaks of $Mg_2SO_4$, $Mg_2AlO_4$ and MgO.

FIG. 3 provides an XRD analysis that shows the reflection of the $\alpha$-$Al_2O_3$ and $Mg_2SiO_4$ phases.

Figure 1A:
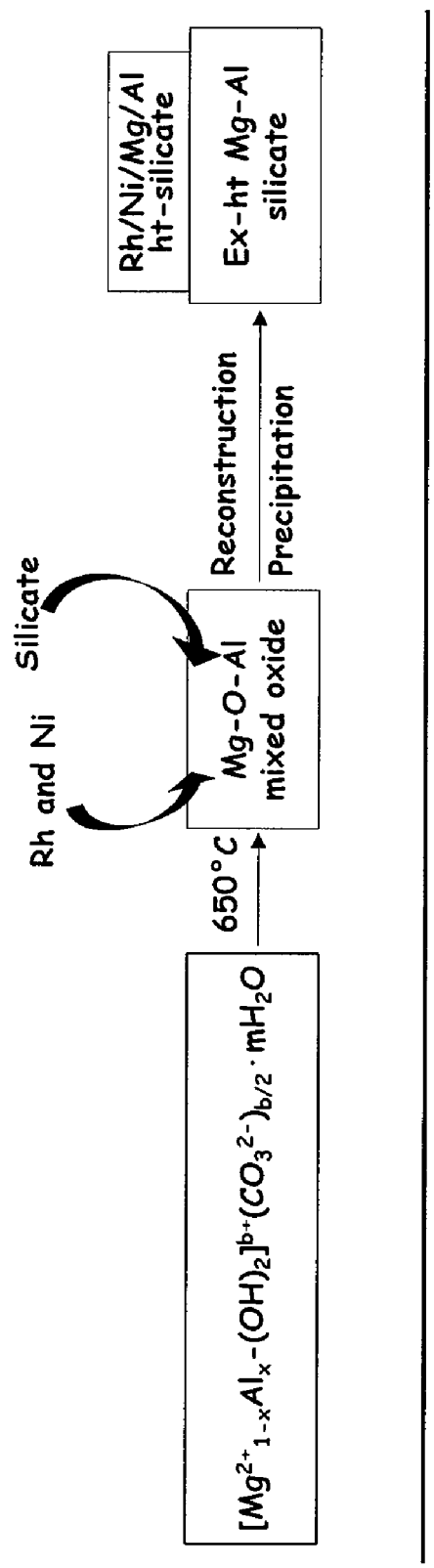
FIG. 1a illustrates the concept in which mixed oxides and silicates with high Rh and Ni concentrations on the surface can be obtained.

According to a first embodiment, the invention relates to a chemical combination (C) between an active solid phase which is covalently bound to the surface of an inert solid phase, characterized in that said solid active phase essentially consists in a solid solution of a mixture of at least a magnesium oxide type phase compound and at least a magnesium silicate type phase compound in which Al, and Rh and/or Ni cations are soluted and characterized in that said inert solid phase is either a compound represented by the general formula (I):

$$Al_aNi_bRh_cMg_dSi_eO_f$$

wherein a, b, c, d, and e are integers which are greater than or equal to 0, f is an integer greater than 0, the sum a+b+c+d≠0, and wherein (3a+2b+3c+2d+4e)/2=f, or a mixture of compounds represented by the said general formula (I), provided that at least one of the Si, Al, Mg, Rh or Ni elements, which is present in the solid active phase, is also present in the solid inert phase.

In the context of the present invention, active phase must be understood as a catalytically active phase for various organic reactions, whereas inert phase corresponds to the non reactive part of the above mentioned chemical combination under the reaction conditions wherein the active phase is active.

In the context of the present invention, chemical combination means that more than 0% of the surface of the inert phase is coated with the active phase.

In the context of the present invention, the inert phase can be in various forms, such as beads, pellets, or monoliths.

In a preferred aspect of the present invention, the amount of active phase on the inert support is in the range from 5% to 60% weight by weight and preferably between 5% and 20% weight by weight of the total combination.

The subject matter of the present invention is more specifically, the above-mentioned chemical combination (C), wherein the inert phase is chosen from among the compounds represented by the general formula (I) as defined above, wherein:

either a=2, b=c=d=e=0 and f=3, and in this case, the inert phase is $Al_2O_3$, either a=2, b=c=0, d=1, e=3 and f=10, and in this case, the inert phase is a mixed oxyde ($3SiO_2$, $Al_2O_3$, MgO), either e=1 and a=b=c=d=0 and f=2, and in this case, the inert phase is $SiO_2$, either a=b=c=0, d=2, e=1 and f=4, and in this case, the inert phase is $Mg_2SiO_4$, or a=2, b=c=d=0, e=2 and f=7, and in this case, the inert phase is $Al_2Si_2O_7$.

According to a second embodiment, the invention relates to a process for the preparation of the chemical combination (C), as defined above, characterized in that it comprises the successive following steps:

Step (a): An hydrotalcite-type precursor of the formula (II):

$$[[Mg_{1-a}Al_a(OH)_2]^{z+}(CO_3^{2-}{}_{z/2}),mH_2O]$$ (II), wherein 0<a<1 and z is the total electrical charge of the cationic element, is calcined to form a mixed oxyde of the formula (III):

$$[(2-2a)MgO,aAl_2O_3]$$ (III);

Step (b): The mixed oxyde of the formula (III), is mixed with water and put to react at alkaline pH, with a $SiO_2$ NaOH solution, together with a $Rh^{+++}$ salt, a $Ni^{++}$ salt or a mixture of both salts, to form a chemical combination (C'), between an active solid phase which is covalently bound to the surface of an inert solid phase, characterized in that said solid active phase essentially consists in an hydrotalcite active solid phase of the formula (IV)

$$[Rh_xNi_yMg_pAl_m(OH)_2]^{z+}(A^{n-}{}_{z/n})kH_2O,$$ (IV)

wherein $A^{n-}$ is mainly a silicate or a polysilicate anion;

0≤x≤0.3, preferably 0≤x≤0.1;

0≤y≤0.9, preferably 0≤y≤0.3;

0≤p≤0.9, preferably 0.3≤p≤0.8;

0≤m≤0.5, preferably 0.1≤m≤0.4;

0≤k≤10, preferably 0≤k≤5;

x+y>0;

0.5≤y+p≤0.9, preferably 0.6≤y+p≤0.8;

x+y+p+m=1; and z is the total electrical charge of the cationic element, and characterized in that said inert solid phase is an hydrotalcite inert solid phase of the formula (V):

$$[[Mg_{2-2a-p}Al_{2a-m}(OH)_2]^{z'+}(A^{n'-}{}_{z'/n'}),k'H_2O]$$ (V), wherein $A^{n'-}$ mainly a silicate or a polysilicate anion;

0≤2-2a-p≤0.9, preferably 0.3≤2-2a-p≤0.8;

0≤2a-m≤0.5, preferably 0.1≤2a-m≤0.4;

0≤k'≤10, preferably 0≤k'≤5;

p+m=1; and z' is the total electrical charge of the cationic element;

Step (c): The chemical combination (C'), is calcined to form the chemical combination (C).

The above mentioned process includes the migration of the elements at short range in relatively mild conditions, that is at a temperature <1000° C.; it is favoured by the proximity among the phases and by the analogies of the lattice structure of both the inert phase precursor and the active-phase precursor. The reaction forms a surface layer of the precursors of mixed oxide and mixed silicate, containing Rh, Ni, Mg and/or Al, which are strongly bonded to the support. Without being ling by the theory, the inventors however believe that the silicates reconstruct the hydrotalcite structure of the inert phase, while the mixed oxide is partially solved and re-precipitated as an hydrotalcite structure, which includes the metallic Rh and Ni in the lattice. Thus, after the calcination, mixed oxides and silicates with high Rh and Ni concentration on the surface can be obtained. The presence of a common oxide and silicate structure guarantees a good interconnection among the phases. This concept is illustrated on FIG. 1a.

According to a third embodiment, the invention relates to a process for the preparation of the chemical combination (C), as defined above, characterized in that it comprises the successive following steps:

Step (a): An hydrotalcite-type precursor of the formula (VI):

$$[[Mg_{1-a}Al_a(OH)_2]^{z+}(A^{n''-}{}_{z/n}),k''H_2O]$$ (VI), wherein 0<a<1, $A^{n''-}$ mainly a silicate or a polysilicate anion and z is the total electrical charge of the cationic element, is calcined to form a mixed oxyde/silicate of the formula (VII):

$$[(2-2a)MgO,aAl_2O_3,a'Al_2Si_2O_7,b'Mg\,SiO_4,d'SiO_2]$$ (VII);

Step (b): The mixed oxyde/silicate of the formula (VII), is put to react with a $Rh^{+++}$ salt, a $Ni^{++}$ salt or a mixture of both salts, to form a chemical combination (C') as defined above;

Step (c): The chemical combination (C'), is calcined to form the chemical combination (C).

The above mentioned process includes the impregnation of Rh and Ni on a hydrotalcite-like mixed Magnesium, Aluminium silicate and oxide of the formula (VII), which generates by calcination, a mixed oxide and silicate phase, with a high Rh and Ni concentration near the surface. The ratio between the oxide phase and the silicate phase is controlled by the amount of silicates during the precipitation of the Hydrotalcite precursors. In fact, this structure is supposed to be intercalated by silicate or polysilicate anions with variable Si composition, which are represented by the general formula: $(Si_nO_{2n+1})^{2-}$. The concept is illustrated on FIG. 1$b$.

According to a fourth embodiment, the invention relates to a process for the preparation of the chemical combination (C), as defined above, characterized in that it comprises the successive following steps:

Step (a): A powder mixture of boehmite ($Al_2O_3$, w $H_2O$) and α-alumina, is added to an alkaline aqueous silicate solution, to form a dispersion which is supplemented with at least one inorganic hydrosoluble salt chosen from hydrosoluble inorganic salts of $Al^{+++}$, $Rh^{+++}$, $Mg^{++}$ and $Ni^{++}$, to form a chemical combination (C") between an active solid phase which is covalently bound to the surface of an inert solid phase, characterized in that said solid active phase essentially consists of an hydrotalcite active solid phase of the formula (IV) as defined above, and characterized in that said inert solid phase is a α-alumina.

Step (b): The chemical combination (C") obtained in of step (a), is calcined to form the chemical combination (C).

Figure 1B:
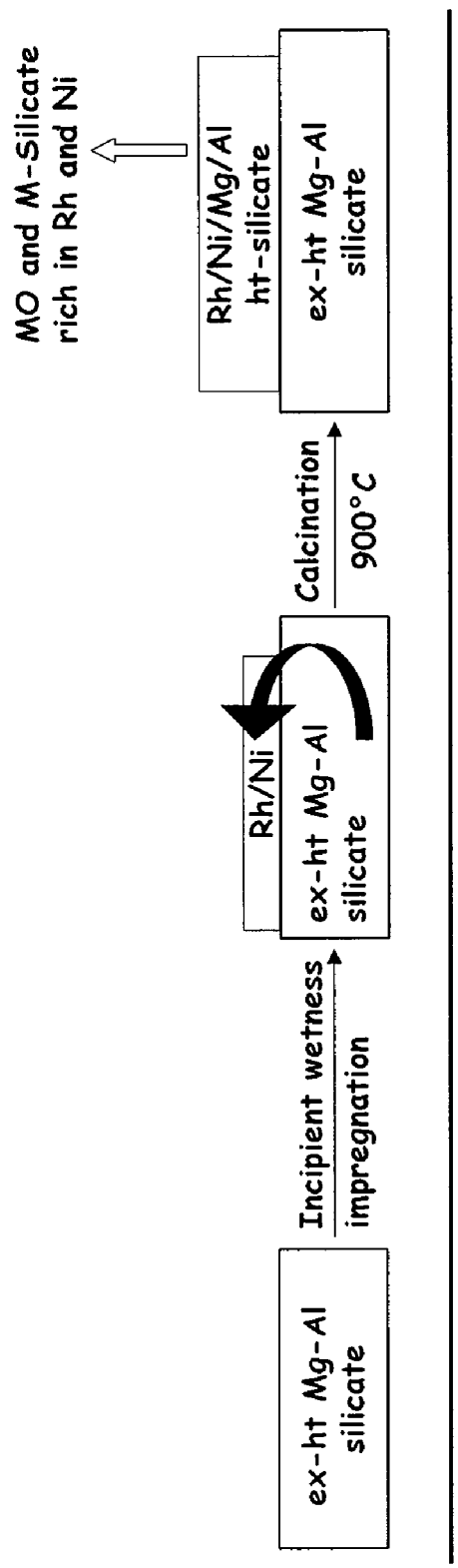
FIG. 1b illustrates a further concept in which a mixed oxide and silicate phase with a high Rh and Ni concentration near the surface can be obtained.

According to this process, the chemical combination (C") also generates by calcination, a mixed oxide and silicate phase, with a high Rh and Ni concentration near the surface. This concept is illustrated in FIG. 1$c$.

According to a fifth embodiment, the invention relates to the chemical combinations (C') and (C"), as defined above.

According to this last embodiment, the invention more specifically relates to combinations (C') and (C") as defined above, wherein the active phase is selected from:

$[Ni_{0.08}Mg_{0.60}Al_{0.32}(OH)_2]^{0.32+}(SiO_3^{2-})_{0.16}kH_2O$,
$[Ni_{0.08}Rh_{0.0015}Mg_{0.60}Al_{0.3185}(OH)_2]^{0.32+}$
$(SiO_3^{2-})_{0.16}kH_2O$,
$[Rh_{0.005}Mg_{0.71}Al_{0.285}(OH)_2]^{0.32+}(SiO_3^{2-})_{0.16}kH_2O$,
$[Ni_{0.01}Rh_{0.0002}Mg_{0.67}Al_{0.3198}(OH)_2]^{0.32+}$
$(SiO_3^{2-})_{0.16}kH_2O$,
$[Ni_{0.02}Mg_{0.63}Al_{0.35}(OH)_2]^{0.35+}(SiO_3^{2-})_{0.175}kH_2O$,
$[Rh_{0.0004}Mg_{0.65}Al_{0.3496}(OH)_2]^{0.35+}(SiO_3^{2-})_{0.175}kH_2O$,
$[Ni_{0.02}Mg_{0.78}Al_{0.20}(OH)_2]^{0.35+}(SiO_3^{2-})_{0.175}kH_2O$,
$[Rh_{0.0004}Mg_{0.80}Al_{0.1996}(OH)_2]^{0.20+}(SiO_3^{2-})_{0.10}kH_2O$, and
$[Ni_{0.027}Rh_{0.00085}Mg_{0.6477}Al_{0.32445}(OH)_2]^{0.20+}$
$(SiO_3^{2-})_{0.16265}kH_2O$.

According to a sixth embodiment, the present invention relates to the chemical combination (C) as defined above, characterized in that it is obtained by calcination of the combination (C') or of the combination (C") as defined above.

The above mentioned chemical combination according to the first embodiment of the present invention is used as a catalyst in chemical reactions involving the conversion of hydrocarbonaceous feedstocks. It is preferably used as a catalyst in the conversion, of natural gas or of low-boiling liquid hydrocarbons ($C_2$-$C_4$ hydrocarbons) into Synthesis gas either by catalytic partial oxydation, or by steam reforming.

The composition according to the present invention is also used in the reactions of reduction of nitrogen oxides, of hydroformulation, of hydrogenation of CO, $CO_2$ and mixtures thereof or as a catalyst of dehydrogenated oxydative reactions.

The chemical combination according the first embodiment of the invention is generally used in temperature operating conditions within the range of 500° C. to 1300° C., preferably between 600° C. to 1100° C., and in pressure operating conditions within the range of $10^5$ Pa to 60 $10^5$ Pa, preferably between 10 $10^5$ Pa to 35 $10^5$ Pa.

The supported catalysts are generally used under temperature and pressure in operating conditions which are reductive atmosphere (natural gas) mixed with an oxydant feed preferably pure oxygen, oxygen and an inert gas mixture, such as nitrogen or argon, steam, carbon dioxide or a mixture of part or/and all of them.

The chemical combination according to the first embodiment of the invention, is generally activated before use, by an "in site" reduction, giving rise to very active and stable Rh and Ni metal particles.

The following examples illustrate the present invention without limiting it.

CATALYST PREPARATION

Example 1

Illustration of the Concept of FIG. 1$a$

A slurry containing 5.00 g of a Mg/Al hydrotalcite with a atomic ratio 69:31, previously calcined at 650° C. (HT650), 4.97 g of a 27 wt % solution of $SiO_2$—NaOH and 1200 ml of $H_2O$ was prepared under magnetic stirring. An aqueous solution of the nitrates of the metals [0.0977 g of a 10 wt % solution of Rh ($NO_3$)$_3$ and 0.8857 g of Ni($NO_3$)$_2$.$6H_2O$ (99%)] was dropped into the slurry, maintaining the pH and the temperature constant (pH=10-11, T=80° C.). The slurry was kept under stirring for 1 h and then filtered and washed with hot water (60° C.). The obtained hydrotalcite was dried overnight at 100° C. and than calcined at 900° C. for 12 h.

The surface area before calcination was 85 m²/g and after calcination was 117 m²/g. The XRD analysis of FIG. 2, shows the peaks of $Mg_2SiO_4$, $Mg_2AlO_4$ and MgO phases (FIG. 2). The hydrotalcite active phase of the intermediate chemical combination (C') can be represented by the following formula:

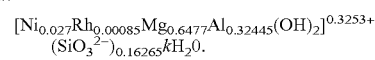

$[Ni_{0.027}Rh_{0.00085}Mg_{0.6477}Al_{0.32445}(OH)_2]^{0.3253+}$
$(SiO_3^{2-})_{0.16265}kH_2O$.

Example 2

Illustration of the Concept of FIG. 1$b$

A Mg/Al hydrotalcite (atomic ratio=68/32) with silicate as anions was prepared by co-precipitation. 5.29 g of a 27 wt % solution of $SiO_2$.NaOH were first added to 120 ml of $H_2O$, and kept under magnetic stirring at 50-60° C. An aqueous solution 0.2M of the nitrates of the metals [20.14 g of Mg($NO_3$)$_2$.$6H_2O$ (99%), 14.00 g of Al($NO_3$)$_3$.$9H_2O$ (98%)], was dropped into the previous solution, maintaining the pH constant (=10.5) with the addition of NaOH 3M and the temperature at 50-60° C. Finally the solution was kept under magnetic stirring for 45 minutes and then filtered and washed with hot water (60° C.). The hydrotalcite obtained was dried overnight at 100° C. and then calcined at 900° C. for 12 h. 5.00 g of the sample obtained were impregnated, by incipient wetness method, using a nitrate solution prepared with 0.227 g of Ni($NO_3$)$_{2-6}H_2O$ (99%) and 0.0149 g of a 10 wt % solution of Rh($NO_3$)$_3$. Then it was calcined at 900° C. for 12 h.

Example 3

Illustration of the Concept of FIG. 1$c$

A boehmite primer was prepared by dispersing 0.50 g of Disperal™ (boehmite sold by Condea Chemie GmBH) in 5 ml of $H_2O$ and 0.031 g of 65 wt % solution of $HNO_3$. 5.00 g of the support, powder of sub-micronic $\alpha$-$Al_2O_3$ (0.4 µm), was added slowly to the boehmite dispersion and then kept under stirring for 30 min at room temperature. The slurry obtained was dried at room temperature overnight. 0.50 g of silicate solution ($SiO_2$.NaOH 27 wt %) were added to 112 ml of $H_2O$ with a small amount of NaOH sufficient to bring the pH=10-11. The powder of $\alpha$-$Al_2O_3$/Disperal was added to this aqueous solution and kept under stirring at 50-60° C., forming a homogeneous dispersion. 1.67 g of $Mg(NO_3)_2 \cdot 6H_2O$ (99%), 1.31 g of $Al(NO_3)_3 \cdot 9H_2O$ (98%), 0.25 g of $Ni(NO_3)_2 \cdot 6H_2O$ (99%) and 0.017 g of a solution 10 wt % of $Rh(NO_3)_3$ were dissolved in 55 ml of $H_2O$. The aqueous solution (0.2M) of the nitrates of the metals was dropped into the silicates/$\alpha$-$Al_2O_3$/Disperal dispersion, maintaining the pH constant (=10-11) by the addition of NaOH 3 M and the temperature at 50-60° C. The dispersion was kept under stirring for 45 minutes and then filtered and washed with hot water (60° C.). The supported hydrotalcite was dried at 100° C. overnight and calcined at 900° C. for 12 h.

The XRD analysis of FIG. 3, shows the reflection of the $\alpha$-$Al_2O_3$ and $Mg_2SiO_4$ phases. The surface area after calcination was 25 $m^2/g$.

The hydrotalcite active phase of the intermediate chemical combination (C') can be represented by the following formula:

Example 4

Figure 1C:
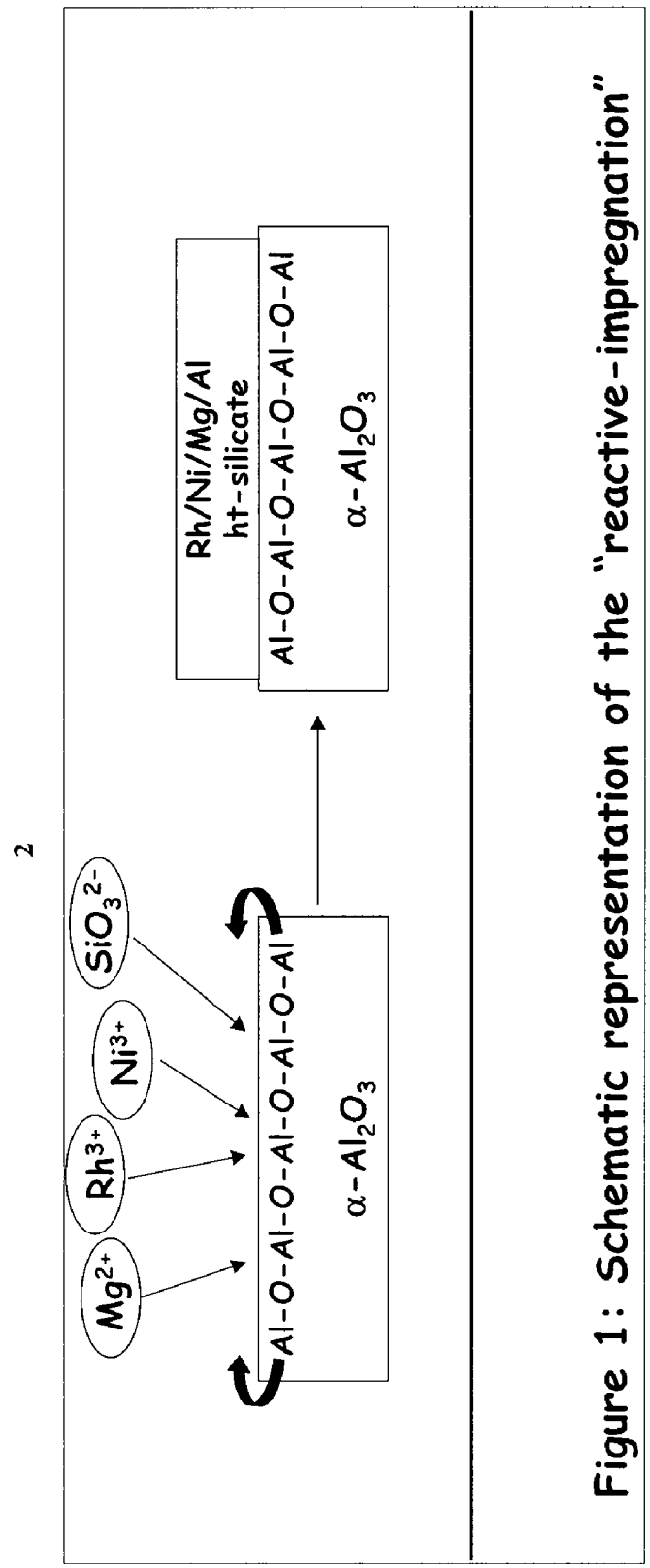
FIG. 1c illustrates a still further concept in which a mixed oxide and silicate phase with a high Rh and Ni concentration near the surface can be obtained.

Illustration of the Concept of FIG. 1c

The $\alpha$-$Al_2O_3$/Disperal support was prepared as in Example 3.

0.50 g of the silicate solution ($SiO_2$—NaOH 27 wt %) were added to 112 ml of distilled water with a small amount of NaOH sufficient to bring the pH=10-11. The powder of $\alpha$-$Al_2O_3$/Disperal was added to this aqueous solution and kept under stirring at 50-60° C., forming a homogeneous dispersion. 1.67 g of $Mg(NO_3)_2 \cdot 6H_2O$ (99%), 0.25 g of $Ni(NO_3)_2 \cdot 6H_2O$ (99%) and 0.017 g of a solution 10 wt % of $Rh(NO_3)_3$ were dissolved in 55 ml of $H_2O$. The aqueous solution (0.2M) of the metal nitrates, was dropped into the silicates/$\alpha$-$Al_2O_3$/Disperal dispersion, maintaining the pH constant (=10-11) by addition of NaOH 3 M and the temperature at 50-60° C. At the end of the dropping, the solution was left under stirring for 45 minutes and then filtered and washed with hot water (60° C.). The hydrotalcite so obtained was dried at 100° C. overnight and then calcined at 900° C. for 12 h.

In this example, the hydrotalcite supported on Disperal/$\alpha$-$Al_2O_3$ was prepared assuming that part of the boehmite-$\alpha$-$Al_2O_3$ support may be dissolved to deliver $Al^{3+}$ ions.

The XRD analysis of FIG. 3, shows the reflection of the $\alpha$-$Al_2O_3$ and $Mg_2SiO_4$ phases. The surface area after calcination was 22 $m^2/g$.

Example 5

Illustration of the Concept of FIG. 1c 0.50 g of a 27 wt % solution of $SiO_2$—NaOH were first added to 112 ml of $H_2O$ together with an amount of NaOH sufficient to maintain the pH=10-11. Then 5.00 g of beads of $\alpha$-$Al_2O_3$ were added to the aqueous solution and kept under stirring at 50-60° C. 1.67 g of $Mg(NO_3)_2 \cdot 6H_2O$ (99%), 1.31 g of $Al(NO_3)_3 \cdot 9H_2O$ (98%), 0.25 g of $Ni(NO_3)_2 \cdot 6H_2O$ (99%) and 0.017 g of a 10 wt % solution of $Rh(NO_3)_3$ were dissolved in 55 ml of $H_2O$. The aqueous solution 0.2M of the nitrates of the metals was dropped into the silicates/support, maintaining the pH constant (=10-11) by addition of NaOH 3 M and the temperature at 50-60° C. Finally the solution was kept under stirring for 45 minutes and then filtered, washed with hot water (60° C.) and dried at 100° C. overnight.

Using the beads of $\alpha$-$Al_2O_3$, the hydrotalcite precursor does not tie together with the support. The result was that the beads remained intact, but separated from the active phase.

Example 6

Illustration of Classical Coating—Deposition on Beads of $\alpha$ Alumina/Disperal In this example, the technical way of supporting the active phase (ex-HT-sil $Ni_8Rh_{0.15}Mg_{60}Al_{31.85}$) on beads of $\alpha$-$Al_2O_3$/Disperal, is the classical method using the formation of ink containing the active phase.

0.50 g of ex-HT-sil $Ni_8Rh_{0.15}Mg_{60}Al_{31.85}$ calcined at 900° C. was dispersed in 5.0 g of $H_2O$ and 0.031 g of 65 wt % solution of $HNO_3$ and mixed for some hours. 5.00 g of the support, beads of $\alpha$-$Al_2O_3$/Disperal, was added to the dispersion and kept under stirring for some hours at room temperature, dried at room temperature overnight and then calcined at 900° C. for 12 h.

Catalytic Tests

The sample of example 5 was not tested, because the hydrotalcite precursor does not tie together with the support made by beads of $\alpha$-$Al_2O_3$. The result was that the beads remained intact, but separated from the active phase.

No interaction is developed between the active phase (HT-silicate material) and the support (-alumina) prepared in these conditions.

After reduction of the catalysts under a mixture of $N_2$ and $H_2$ at 750° C. (v/v) for 12 h, the materials were tested in Catalytic Partial Oxidation reactions (called hereafter: CPO test).

The preliminary reduction is useful to obtain a maximum catalytic activity without induction time for activation and stabilisation and to avoid the partial oxidation of the catalyst. This activation could also be obtained under reaction conditions with the methane/oxygen/helium mixture.

The tests were carried out in a fixed bed quartz microreactor of 8 mm of diameter, loaded with 0.50 g of catalyst (20-40 mesh). The tests were carried out at atmospheric pressure, with different feeds and two different oven temperatures:

methane/oxygen/helium 2/1/20 at 500° C. and 750° C. (residence time=0.065 s), methane/oxygen/helium 2/1/4 at 750° C. (residence time=0.065 s)

methane/oxygen/helium 2/1/1 at 750° C. (residence time=0.111 s) and methane/oxygen/helium 4/2/2 at 750° C. (residence time=0.056 s).

The reaction products were analysed by gas chromatography. All the catalysts showed in all conditions total oxygen conversion.

The oven temperature is the temperature of the gas mixture just before the catalytic bed. The temperature maximal ($T_{max}$) is the maximum temperature measured moving the thermocouple through the catalytic bed.

CPO Tests with the Catalyst of Example 1

CPO tests were carried out using:

methane/oxygen/helium 2/1/20 at 500° C. and 750° C. (residence time=0.065 s), methane/oxygen/helium 2/1/4 at 750° C. (residence time=0.065 s)

methane/oxygen/helium 2/1/1 at 750° C. (residence time=0.111 s) and methane/oxygen/helium 4/2/2 at 750° C. (residence time=0.056 s).

The methane conversion and CO and $H_2$ selectivity were high both at low (500° C.) and high oven temperature.

The catalytic performances of this catalyst reached the maximum with the methane/oxygen/helium 2/1/20 mixture at 750° C., showing very high value. Using the harder reaction conditions the $CH_4$ conversion and the CO and $H_2$ selectivities were about constant and maintained high values.

No deactivation of the catalyst was observed coming back to initial conditions (500° C. and 2/1/20 feed) after several days.

The results of the tests are consolidated in Table 1.

TABLE 1

| Gas mixture ($CH_4/O_2/He$) | Oven temperature (° C.) | $CH_4$ conversion | CO selectivity | $H_2$ selectivity | $T_{max}$ (° C.) |
|---|---|---|---|---|---|
| 2/1/20 | 500° C. | 57.1 | 53.4 | 75.6 | 604 |
| 2/1/20 | 750° C. | 96.3 | 95.7 | 93.4 | 785 |
| 2/1/4 | 750° C. | 85.0 | 96.3 | 89.9 | 841 |
| 2/1/1 | 750° C. | 81.8 | 96.0 | 89.8 | 839 |
| 4/2/2 | 750° C. | 79.8 | 96.8 | 89.8 | 886 |
| 2/1/20 **(RET) | 500° C. | 56.0 | 53.5 | 74.8 | 601 |

*: initial test conditions
**(RET): return to initial test conditions after several experimental conditions (temperature, . . . )

CPO Tests with the Catalyst of Example 3

The catalyst showed an increase of activity in respect to that prepared as in example 1, both at low and high temperature. This was due to the better dispersion of the active phase in the bulk of the support.

The results of the tests are consolidated in Table 2.

TABLE 2

| Gas mixture ($CH_4/O_2/He$) | Oven temperature (° C.) | $CH_4$ conversion | CO selectivity | $H_2$ selectivity | $T_{max}$ (° C.) |
|---|---|---|---|---|---|
| 2/1/20* | 500° C. | 67.1 | 67.4 | 82.7 | 600 |
| 2/1/20 | 750° C. | 98.8 | 92.9 | 95.7 | 786 |
| 2/1/4 | 750° C. | 88.5 | 96.2 | 94.3 | 840 |
| 2/1/1 | 750° C. | 87.0 | 95.8 | 92.2 | 845 |
| 4/2/2 | 750° C. | 85.6 | 95.7 | 94.6 | 905 |
| 2/1/20 **(RET) | 500° C. | 64.5 | 62.3 | 80.0 | 599 |

*initial test conditions
**(RET): return to initial conditions after several experimental tests conditions (temperature, . . . )

CPO Tests with the Catalyst of Example 6

The catalyst showed lower methane conversion in comparison to the sample prepared as in example 1 feeding the 2/1/20 gas mixture at 500° C. Using harder reaction conditions the catalytic performances are close to those of the sample of the example 1. No deactivation of the catalyst was observed coming back to initial conditions (500° C. and 2/1/20 feed).

The results of the tests are consolidated in Table 3.

TABLE 3

| Gas mixture ($CH_4/O_2/He$) | Oven temperature (° C.) | $CH_4$ conversion | CO selectivity | $H_2$ selectivity | $T_{max}$ (° C.) |
|---|---|---|---|---|---|
| 2/1/20* | 500° C. | 67.1 | 76.4 | 75.7 | 502 |
| 2/1/20 | 750° C. | 98.8 | 94.0 | 93.6 | 813 |
| 2/1/4 | 750° C. | 88.5 | 93.4 | 93.2 | 905 |
| 2/1/1 | 750° C. | 87.0 | 91.4 | 90.5 | 924 |
| 2/1/20 **(RET) | 500° C. | 52.2 | 40.9 | 75.7 | 556 |

*initial test conditions
**(RET): return to initial test conditions after several experimental conditions (temperature, . . . )

These results demonstrate that a catalyst made by a classical coating (example 6) is less efficient in terms of methane conversion than the same catalyst made by the process according to the concept of FIG. 1c.

Time-on-stream CPO Tests of the Catalyst of Example 3

The objective is to prove the stability of the supported catalyst prepared by "reactive-impregnation" method during time on stream.

In all reaction conditions no deactivation was observed with time-on-stream. At 750° C. the methane conversion was around 84%. CO and $H_2$ selectivities respectively 96 and 91%.

These values are equal to the conversion and the selectivities obtained under the same operating conditions (contact time, temperature, gas feed ratio) on the bulk unsupported catalyst Ex-HT-sil $Ni_8Rh_{0.15}Mg_{60}Al_{31.85}$; see patent demand EP 1511566.

Figure 4:
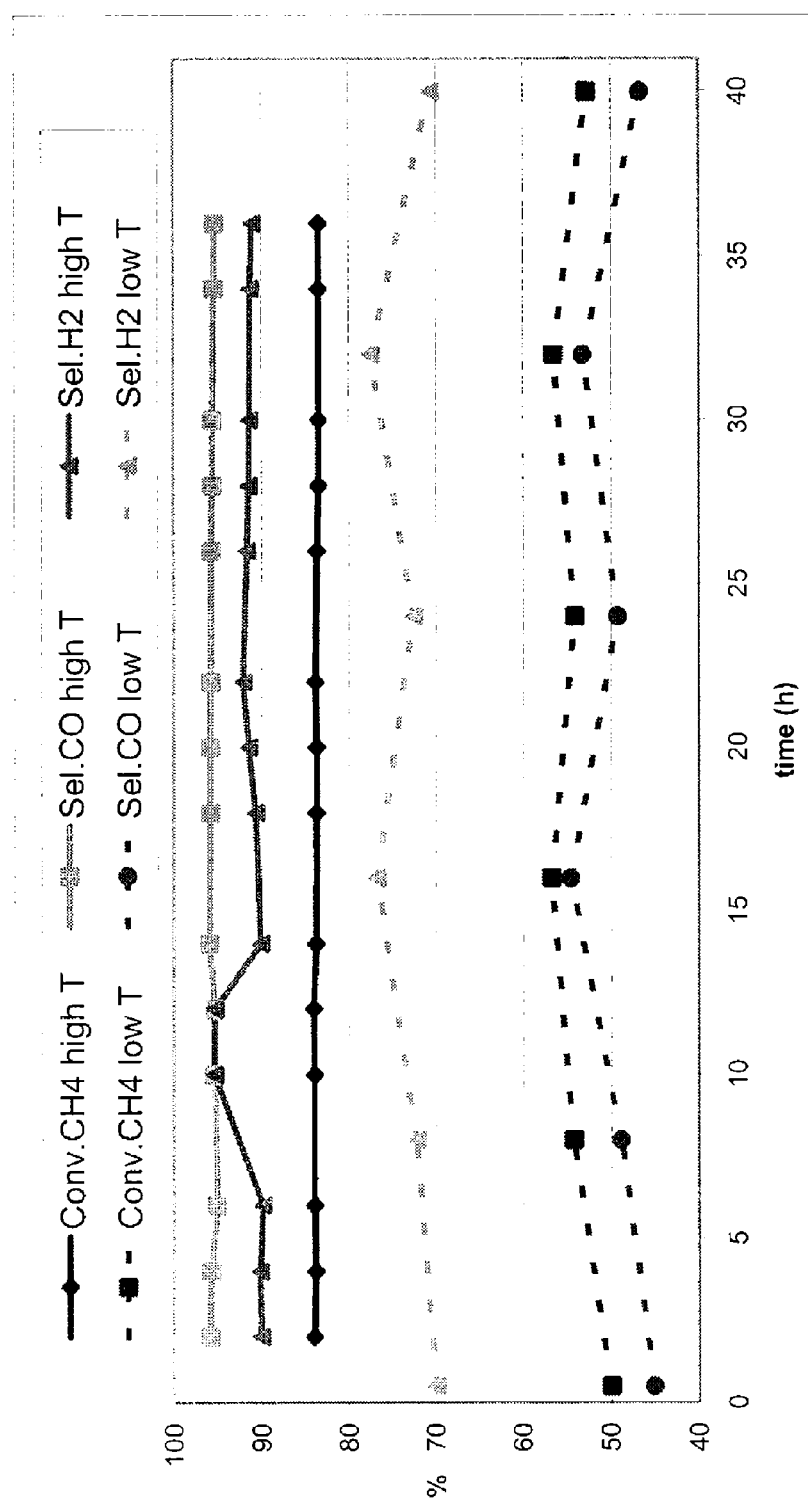
FIG. 4 provides the CPO duration test results on $Ni_8Rh_{0.15}Mg_{60}Al_{31.85}$/Dispersal/$\alpha$-$Al_2O_3$ (Example 3).

The results are given in FIG. 4.

The invention claimed is:

1. A chemical combination (C'), between an active solid phase which is covalently bound to the surface of an inert solid phase, wherein the solid active phase comprising a hydrotalcite active solid phase of the formula (IV):

$$[Rh_xNi_yMg_pAl_m(OH)_2]^{z+}(A^{n-}_{z/n})k\,H_2O, \qquad (IV)$$

wherein $A^{n-}$ is mainly a silicate or a polysilicate anion;
$0 \leq x \leq 0.3$;
$0 \leq y \leq 0.9$;
$0 \leq p \leq 0.9$;
$0 \leq m \leq 0.5$;
$0 \leq k \leq 10$;
$x+y>0$;
$0.5 \leq y+p \leq 0.9$;
$x+y+p+m=1$; and
z is the total electrical charge of the cationic element, and wherein the inert solid phase is a hydrotalcite inert solid phase of the formula (V):

$$[[Mg_{2-2a-p}Al_{2a-m}(OH)_2]^{z'+}(A^{n'-}_{z'/n}),k'H_2O] \qquad (V),$$

wherein $A^{n'-}$ is mainly a silicate or a polysilicate anion;
$0 \leq 2-2a-p \leq 0.9$;
$0 \leq 2a-m \leq 0.5$;
$0 \leq k' \leq 10$;
$p+m=1$; and
z' is the total electrical charge of the cationic element.

2. The chemical combination of claim 1, wherein the active phase is selected from the group consisting of:
$[Ni_{0.08}Mg_{0.60}Al_{0.32}(OH)_2]^{0.32+}(SiO_3^{2-})_{0.16}kH_2O$,
$[Ni_{0.08}Rh_{0.0015}Mg_{0.06}Al_{0.3185}(OH)_2]^{0.32+}(SiO_3^{2-})_{0.16}kH_2O$,
$[Rh_{0.005}Mg_{0.71}Al_{0.285}(OH)_2]^{0.32+}(SiO_3^{2-})_{0.16}kH_2O$,
$[Ni_{0.01}Rh_{0.0002}Mg_{0.67}Al_{0.3198}(OH)_2]^{0.32+}(SiO_3^{2-})_{0.16}kH_2O$,
$[Ni_{0.02}Mg_{0.63}Al_{0.35}(OH)_2]^{0.35+}(SiO_3^{2-})_{0.175}kH_2O$,
$[Rh_{0.0004}Mg_{0.65}Al_{0.3496}(OH)_2]^{0.35+}(SiO_3^{2-})_{0.175}kH_2O$, $[Ni_{0.02}Mg_{0.78}Al_{0.20}(OH)_2]^{0.35+}(SiO_3^{2-})_{0.175}kH_2O$,
$[Rh_{0.0004}Mg_{0.80}Al_{0.1996}(OH)_2]^{0.20+}(SiO_3^{2-})_{0.10}kH_2O$, and
$[Ni_{0.027}Rh^{0.00085}Mg_{0.6477}Al^{0.32445}(OH)_2]^{0.3253+}(SiO_3^{2-})_{0.16265}kH_2O$.

3. The chemical combination of claim 1 wherein:
$0 \leq x \leq 0.1$,
$0 \leq y \leq 0.3$,
$0.3 \leq p \leq 0.8$,
$0.1 \leq m \leq 0.4$,
$0 \leq k \leq 5$, and
$0.6 \leq y+p \leq 0.8$.

4. The chemical combination of claim 1 wherein:
$0.3 \leq 2-2a-p \leq 0.8$,
$0.1 \leq 2a-m \leq 0.4$, and
$0 \leq k \leq 5$.

5. A chemical combination (C'), between an active solid phase which is covalently bound to the surface of an inert solid phase, wherein the solid active phase comprising a hydrotalcite active solid phase of the formula (IV):

$$[Rh_xNi_yMg_pAl_m(OH)_2](A^{n-}_{z/n}) \, kH_2O, \qquad (IV)$$

wherein $A^{n-}$ is mainly a silicate or a polysilicate anion;
$0 \leq x \leq 0.1$;
$0 \leq y \leq 0.3$;
$0.3 \leq p \leq 0.8$;
$0.1 \leq m \leq 0.4$;
$0 \leq k \leq 5$;
$x+y>0$;
$0.6 \leq y+p \leq 0.8$;
$x+y+p+m=1$; and
z is the total electrical charge of the cationic element, and wherein the inert solid phase is a hydrotalcite inert solid phase of the formula (V):

$$[[Mg_{2-2a-p}Al_{2a-m}(OH)_2]^{z'+}(A^{n'-}_{z'/n'}), k'H_2O] \qquad (V),$$

wherein $A^{n'-}$ is mainly a silicate or a polysilicate anion;
$0.3 \leq 2-2a-p \, 0.8$;
$0.1 \leq 2a- \leq 0.4$;
$0 \leq k' \leq 5$;
$p+m=1$; and
z' is the total electrical charge of the cationic element.

* * * * *

UNITED STATES PATENT AND TRADEMARK OFFICE
CERTIFICATE OF CORRECTION

PATENT NO. : 8,105,973 B2
APPLICATION NO. : 12/949289
DATED : January 31, 2012
INVENTOR(S) : F. Basile et al.

Page 1 of 1

It is certified that error appears in the above-identified patent and that said Letters Patent is hereby corrected as shown below:

In Column 12, line 53, replace "$0 \leq 2-2a \leq p0.9$;" with --$0 \leq 2-2a-p \leq 0.9$;--.

In Column 12, line 61, replace "$[Ni_{0.08}Rh_{0.0015}Mg_{0.06}Al_{0.3185}(OH)_2]^{0.32+}(SiO_3^{2-})_{0.16}kH_2O$," with --$[Ni_{0.08}Rh_{0.0015}Mg_{0.60}Al_{0.3185}(OH)_2]^{0.32+}(SiO_3^{2-})_{0.16}kH_2O$,--.

In Column 13, line 4, replace "$[Ni_{0.027}Rh^{0.00085}Mg_{0.6477}Al^{0.32445}(OH)_2]^{0.3253+}(SiO_3^{2-})_{0.16265}kH_2O$." with --$[Ni_{0.027}Rh_{0.00085}Mg_{0.6477}Al_{0.32445}(OH)_2]^{0.3253+}(SiO_3^{2-})_{0.16265}kH_2O$.--.

In Column 13, line 21, replace "$[Rh_xNi_yMg_pAl_m(OH)_2](A^{n-}{}_{z/n})\ kH_2O$," with --$[Rh_xNi_yMg_pAl_m(OH)_2]^{z+}(A^{n-}{}_{z/n})kH_2O$,--.

In Column 14, line 16, replace "$0.3 \leq 2-2a-p0.8$;" with --$0.3 \leq 2-2a-p \leq 0.8$;--.

In Column 14, line 17, replace "$0.1 \leq 2a- \leq 0.4$;" with --$0.1 \leq 2a-m \leq 0.4$;--.

Signed and Sealed this
Seventeenth Day of April, 2012

David J. Kappos
*Director of the United States Patent and Trademark Office*